United States Patent [19]

Bernard

[11] Patent Number: 4,632,790
[45] Date of Patent: Dec. 30, 1986

[54] REPAIR METHOD FOR DRYWALLS AND LIKE CONSTRUCTION MATERIALS

[75] Inventor: André Bernard, Mount Kisco, N.Y.

[73] Assignee: Meric Industries, Inc., New York, N.Y.

[21] Appl. No.: 722,840

[22] Filed: Apr. 11, 1985

[51] Int. Cl.⁴ .......................................... B32B 35/00
[52] U.S. Cl. ........................................ 264/36; 156/85;
  156/94; 264/230; 264/342 R; 264/DIG. 71;
  428/63
[58] Field of Search ................ 264/36, 230, 342 R,
  264/25, DIG. 71; 428/63, 64; 156/85, 94, 98;
  425/11, 12

[56] References Cited

U.S. PATENT DOCUMENTS

| | | | |
|---|---|---|---|
| 3,397,253 | 8/1968 | Merten et al. | 525/130 X |
| 3,483,965 | 12/1969 | Rosenblatt et al. | 156/85 X |
| 4,122,222 | 10/1978 | Parker | 428/66 |
| 4,247,509 | 1/1981 | Talbot | 264/230 |
| 4,358,495 | 11/1982 | Parker | 428/66 |
| 4,460,420 | 7/1984 | Estrada | 156/64 |
| 4,471,594 | 9/1984 | Doyle | 52/514 |

*Primary Examiner*—Donald Czaja
*Assistant Examiner*—Mary Lynn Fertig
*Attorney, Agent, or Firm*—Gottlieb, Rackman & Reisman

[57] ABSTRACT

The within inventive method for repairing a drywall surface (i.e. gypsum boards) or a plaster wall or ceiling, obviates the need for spackling and contemplates instead the use of a plastic film in covering relation over the surface defect and in this position properly prepared, so that the plastic is totally devoid of wrinkles and in firm attachment to the surface, with the result that the repair cannot be detected from the original surface.

5 Claims, 6 Drawing Figures

REPAIR METHOD FOR DRYWALLS AND LIKE CONSTRUCTION MATERIALS

The present invention relates generally to improvements in making repairs to plaster walls and ceilings of private dwellings, the repairs more particularly being necessary because cracks will sometimes develop in joints that originally were properly filled with tape and joint cement, or nails will sometimes work loose because of warping and buckling of the framework inside the wall or because the wrong kind of nails were used.

The invention repair method hereof is also contemplated for use with construction materials less prone to developing cracks than plaster, but which nevertheless on occasion need repairs, such as gypsum board panels, commonly referred to as drywall construction, which, like plaster, is also typically used as the construction material for walls and ceilings of private dwellings or the like.

Using the making of repairs or the patching of a drywall as illustrative of the within invention, said inventive method as applied to drywall repairs contemplates a procedure which is characterized by simplicity and ease of use. Thus, when cracks do occur in drywall it is almost always along one of the joints or seams that were filled in with joint cement and the repair is made usually by cutting the crack a little wider with a pointed tool (which could be as common as a beverage can opener), and then filling the crack with spackling compound or joint cement.

As another example of prior art technique, reference should be made to U.S. Pat. No. 4,358,495 which relates to a drywall patching method in which cracks and holes therein are patched using putty and a patch with layers of drywall paper cemented together.

In contrast to the foregoing, the within inventive drywall and plaster patching method contemplates the use of a high temperature-resistant, shrinkable film with a thickness of from 20 to 100$\mu$. Shrinkable films of polyhydantoins which are resistant to temperatures of up to 260° C. are particularly suitable. Shrinkable films of polyhydantoins, polymers which are prepared in accordance with U.S. Pat. No. 3,397,253 are obtained from a polyhydantoin solution by casting techniques known per se and by subsequently stretching the films thus obtained monoaxially or biaxially at temperatures just below the solidification point of the polymer in a stretching ratio of from 1.1 to 3.0. These films shrink under the influence of temperatures above the stretching temperature in the proportions according to the stretching ratio, provided that they are not mechanically impeded.

In accordance with the present invention, it has been determined that the temperature generated by the hot air from a conventional hand-held hair dryer, which is typically in the range of 115° C. to 148° C. is well suited to effectively cause the size diminishment noted above in the shrinkable film referred to, and yet is of course significantly below the disintegration temperature of 176° C. thereof.

It also has been determined in accordance with the present invention that in the range of shrink-producing temperatures just noted, the film is rendered tacky or adhesive, and thus is in an advantageous condition to be adhered in attached relation to a support surface, such as a wall or ceiling. Also, in this specific regard, the pressure of the hot air stream from the hair dryer impinging on the tacky film contributes to holding it in contact against the support surface and allowing the adhesive attachment thereto to take place.

The result of the adhesive attachment to the wall or the like of the film, while it is undergoing a diminishment in dimension or size, is the creation on the wall of a thin plastic film totally devoid of wrinkles, and thus a plastic film firmly attached totally flat against the wall. In accordance with the present invention, the resulting firmly attached smooth plastic film provides a drywall or plaster wall patching method, in accordance with the method steps described subsequently herein, that is a significant advance over the prior art methods using spackling compound or the like.

The above brief description, as well as further objects, features, and advantages of the present invention, will be more fully appreciated by reference to the following detailed description of the within inventive method in conjunction with the accompanying drawings describing said method in sequence, wherein.

Figure 1:
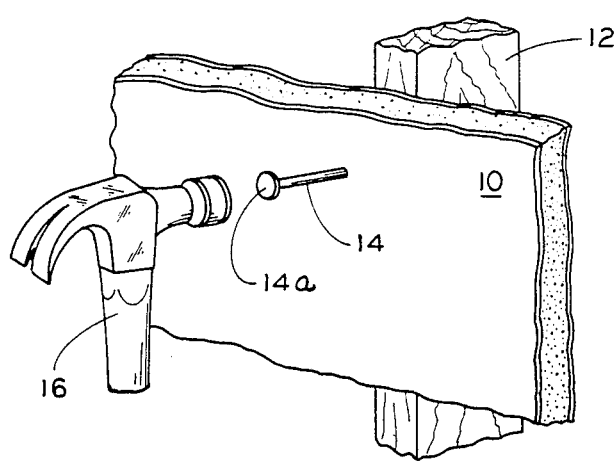
FIG. 1 is an isometric view illustrating the attachment of a drywall panel to a vertical support.
Figure 2:
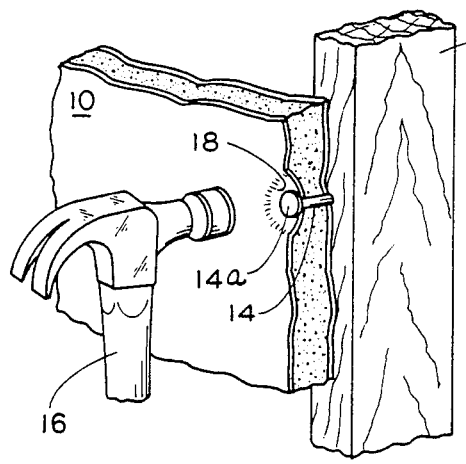
FIG. 2 is similarly an isometric view illustrating the formation of a depression in the surface of the drywall as a result of said attachment.

In contrast to the use of spackle to repair or patch damaged areas of drywall or plaster surfaces, the within inventive method contemplates the use of heat shrinkable plastic film. The manner of applying and preparing this film should be readily understood from the drawings which illustrate in sequence the within inventive method. More particularly, as illustrated in FIG. 1, a gypsum board panel 10 when being attached to a vertical support 12 with a nail and hammer 14, 16 will invariably result, as illustrated in FIG. 2, in a surface depression 18 in the surface of the panel 10 in the vicinity of the nail head 14a.

Figure 3:
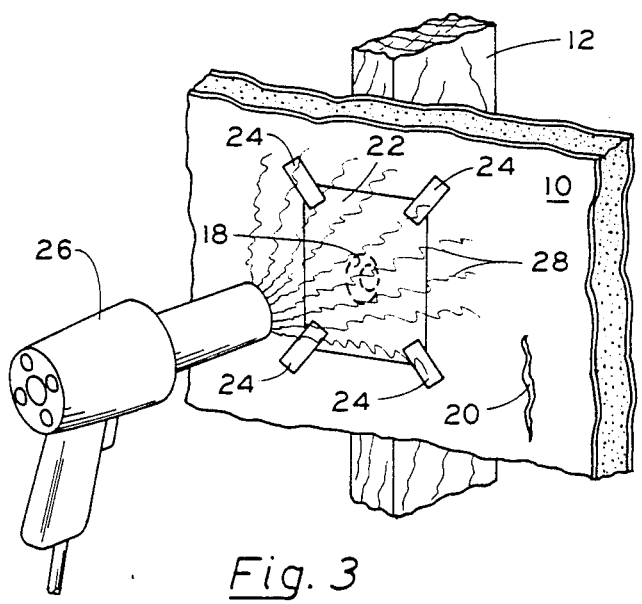
FIG. 3 illustrates the application of a plastic film in covering relation over the depression and the proper preparation of the plastic film so that its presence cannot be detected, including the removal of all wrinkles from the film.

It is an object of the within invention to repair or patch the panel 10 by effectively masking the depression 18 from view or, in other words, obviating an observer from detecting the presence of the depression 18. Referring now to FIG. 3, which illustrates the application of a heat shrinkable plastic patch, such as is commercially available and described in previously noted U.S. Pat. No. 3,397,253, it will of course also be understood that the inventive method hereof can also be applied to a plaster surface, as well as to a drywall, and that the repair could be to a longitudinally extending small dimension crack 20, as well as to a circular depression 18. With this understanding, FIG. 3 illustrates that the within inventive method contemplates cutting to appropriate size a patch 22 of the heat shrinkable plastic referred to. Patch 22 is positioned in covering relation over the surface depression 18 using tabs of masking tape 24. In this initial condition of the plastic patch 22 it will, of course, not effectively mask the presence of the depression 18 because there unavoidably will be surface wrinkles in the patch 22. Also, of course, the tape 24 does not establish a firm enough attachment of the patch 22 to the surface of the drywall 10.

Still referring to FIG. 3, the within inventive method therefore contemplates the use of a conventional hot air blower 26 which in operation will provide a hot air stream 28 that will impinge against the patch 22 in a direction normal thereto. As understood, the temperature of the hot air stream 28 of a typical blower 26 is in the range between 115° to 148° C. and thus will cause a shrinking or contraction in the dimension of the patch 22, but without causing the patch 22 to reach its kindling temperature. The impinging hot air stream 28 not only heats up the patch 22 so that it becomes tacky and adhesive, but also the application of the air stream in a direction normal to the patch holds it under an applied pressure against the surface of the panel 10. It is also to be noted that the tape 24, while assisting in holding the patch 22 against the panel 10, does not impede the patch 22 from shrinking or contracting in size in the plane of the surface of the panel 10.

Figure 4:
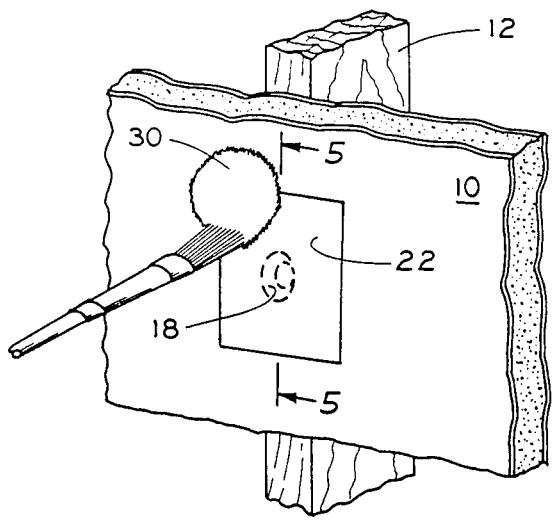
FIG. 4 illustrates the final preparation of the plastic film which completely masks its presence from view.

Referring now to FIG. 4, it will be understood that as a result of the air stream 28 of the blower 26, the patch 22 will shrink or contract in size and that this contraction will remove all surface wrinkles therefrom. Also, the tackiness induced by the elevated temperature will result in the patch 22 firmly adhering to the panel 10 when the patch cools or solidifies. As a result, and as illustrated in FIG. 4, patch 22 will be understood to be firmly attached to the surface of the panel 10, and will manifest a wrinkle-free appearance in its surface to thereby effectively mask from view the surface depression 18. The final step contemplated is, of course, the application of a coat of paint 30 over the taut, firmly attached patch 22 which is flat against the surface of the panel 10.

Figure 5:
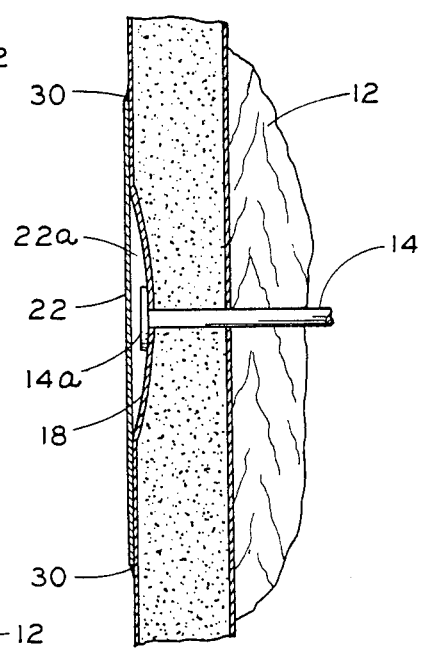
FIG. 5 is a cross sectional view taken along line 5—5 of FIG. 4, illustrating further structural details in the manner in which the plastic film covers the surface depression of the drywall.

The referred to advantageous positioning of the patch 22 in covering relation over the depression 18 of the nail 14 is more particularly illustrated in the enlarged scale cross sectional view of FIG. 5. Although it is also illustrated in FIG. 5 that the depression 18 is not filled, as with spackle or the like, and that there is therefore no support directly beneath the patch 22, it has been found in practice that this support for the patch 22 is unnecessary in connection with small dimensioned depressions or cracks. In fact, with respect to cracks which invariably result from warping or buckling of the framework inside the wall, it has been found in practice that it could be an advantage to have a clearance 22a beneath the patch 22 in order to relive the drywall 10 of the stresses produced by the framework warping and buckling.

Figure 6:
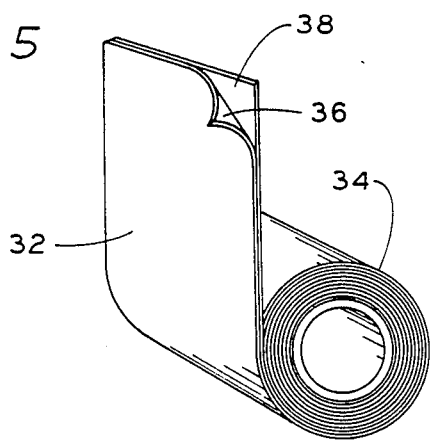
FIG. 6 is another embodiment for applying the plastic film as a patch to cover surface cracks and depressions in a drywall surface.

As an alternative to cutting the patch 22 to size and using the tape 24, the present invention also contemplates obtaining the patch from heat shrinkable material in strip form 32 that is put up on a supply roll 34, as illustrated in FIG. 6. In this form, the underside surface of the strip 32 is advantageously provided with an adhesive surface 36 which is exposed and thus available for use for attachment to the panel 10 upon removal of a backing strip 38.

Although the use of a hair blow dryer 26 is preferred, since it not only raises the temperature of the heat shrinkable patch 22, but also applies pressure normal thereto during the shrinking of the patch, use can also be made of an iron or other heating device to properly prepare the patch when it is in place in covering relation over the surface irregularity which is to be repaired. In other respects as well, a latitude of modification, change and substitution is intended in the foregoing disclosure and in some instances some steps of the inventive method will be employed without a corresponding use of other steps. Accordingly, it is appropriate that the appended claims be construed broadly and in a manner consistent with the spirit and scope of the invention herein.

What is claimed is:

1. For masking a small dimension crack in a drywall or plaster surface of a dwelling, a repair method using a temperature generated by a dwelling appliance of below 150° C. and heat shrinkable plastic film, said method comprising the steps of cutting to an appropriate size a repair patch of said heat shrinkable plastic film for placement in covering relation over said small dimension crack, positioning said plastic patch in place against said surface having said crack without impeding said patch against contraction in size in the plane of said surface and without totally removing all wrinkles therefrom, applying heat below 150° C. to said patch while exerting pressure normal thereto so as to cause a contraction in size in said patch which totally removes all wrinkles therefrom simultaneously with said pressure maintaining said contact between said patch and said surface, whereby said patch firmly attaches itself to said surface while manifesting therein a wrinkle-free appearance to thereby effectively mask from view said crack in said surface.

2. A surface repair method using a heat shrinkable plastic repair patch as claimed in claim 1, wherein said application of heat is achieved using a hot air blower such that heat is transferred to said repair patch by the impingement of a stream of hot air thereagainst which also exerts pressure normal to said repair patch to thereby maintain the contact thereof with said surface without impeding contraction in size in said patch in the plane of said surface.

3. A surface repair method using a heat shrinkable plastic repair patch as claimed in claim 2, wherein said positioning of said plastic patch is by applying under hand pressure masking tape in select locations thereto and to said surface, whereby said masking tape holds said patch in place without impeding the contraction in size thereof.

4. A surface repair method using a heat shrinkable plastic repair patch as claimed in claim 2, wherein said plastic patch has an adhesive film on one surface thereof and said positioning of said plastic patch is by establishing contact between said adhesive film and said surface, whereby said adhesive film holds said patch in place without impeding the contraction in size thereof.

5. For masking a crack in a drywall or plaster surface of a dwelling, a repair method using heat shrinkable plastic film, said method comprising the steps of placing a repair patch of said heat shrinkable plastic film over said crack, applying heat to said patch while exerting a pressure normal thereto so as to cause a contraction in size in said patch while exerting a pressure normal thereto so as to cause a contraction in size in said patch which totally removes all wrinkles therefrom simultaneously with said pressure maintaining said contact between said patch and said surface, whereby said patch firmly attaches itself to said surface while manifesting therein a wrinkle-free appearance to thereby effectively mask from view said crack in said surface.

* * * * *